Dec. 15, 1936.  G. A. TINNERMAN  2,064,091
FASTENING DEVICE
Filed July 28, 1936

INVENTOR.
GEORGE A. TINNERMAN
BY Bates, Golrick & Teare
ATTORNEYS

Patented Dec. 15, 1936

2,064,091

UNITED STATES PATENT OFFICE 2,064,091

FASTENING DEVICE

George A. Tinnerman, Rocky River, Ohio, assignor to Albert H. Tinnerman, Cleveland, Ohio Application July 28, 1936, Serial No. 93,086

2 Claims. (Cl. 85—36)

This invention relates to spring fasteners and particularly to those which are made of sheet metal and which have one or more yieldable bolt-engaging portions which operate by virtue of their resilient characteristics to permit insertion of a threaded bolt by an endwise movement and subsequent tightening by imparting only a few turns to the bolt.

An object is to provide a spring fastener adapted to be turned effectively while in engagement with the bolt threads, preferably by means of a special tool so that the fastener may not be removed readily except by authorized persons.

Another object is to provide a spring fastener made of sheet-metal, which, without increasing its cost, is adapted and arranged to be turned effectively by a tool while the thread-gripping parts are in engagement with screw threads.

Another object is to provide a spring fastener, which, although made no larger than necessary to support the spring tongue or tongues which are adapted for engagement with the bolt threads, nevertheless possesses means by which the fastener may be turned effectively to tighten it against the work.

Other objects and special advantages will become apparent from the following description relating to the accompanying drawing.

Figure 1:
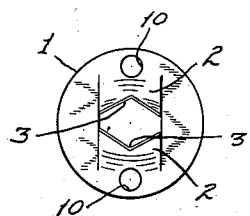
Figure 2:
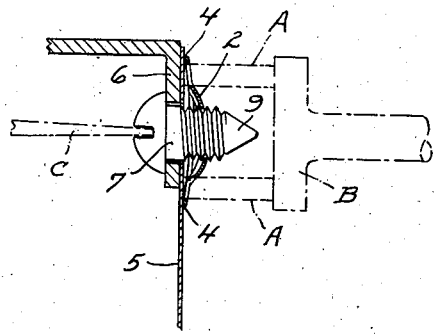
Figure 3:
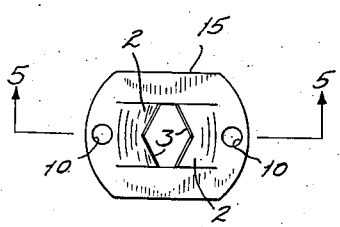
Figure 4:
Figure 5:
Figure 6:
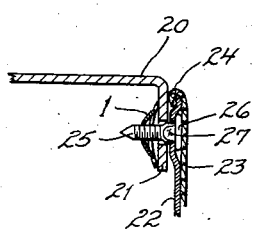

In the drawing, Fig. 1 is a plan view of one form of fastener; Fig. 2 is a sectional view through the fastener in operation on a bolt, the view showing diagrammatically the preferred type of tool for effectively turning the fastener and (in section) two parts secured together by the bolt and fastener; Fig. 3 is a plan view of another form of fastener; Fig. 4 is a side elevation thereof; Fig. 5 is a sectional view taken along the line 5—5 on Fig. 3; and Fig. 6 is an assembly view of a plurality of parts secured by the improved fastener, the view illustrating particularly an arrangement in which the bolt itself could not possibly be turned in relatively tightening the bolt and fastener.

In the use of spring fasteners, there are many cases wherein, due to the peculiarities of the assembly, the fastener itself rather than the bolt or screw must be rotated for tightening purposes. This is particularly true where the head of the bolt is inaccessible, as when it is disposed in a normally concealed position, and where the part to be fastened is of such character that it should be capable of ready removal only by authorized persons. The present fastener finds practical application in attaching name plates, various insignia, etc., to radiators and other parts of motor vehicles. Further examples occur in refrigerator constructions, wherein certain of the parts are secured by bolts having their head portions embedded in and their shanks extending from rubber or plastic bodies. The fasteners are extremely useful wherever, due to lack of room, it is impossible or impractical to turn the bolts or screws in securing parts together through their use.

Referring further to the drawing, and first to Fig. 1, a disc-like body of sheet-metal is indicated at 1, as having a pair of tongues partially sheared therefrom and outstruck from the same side thereof, the tongues being suitably indented, as at 3, to enable them to coact effectively with the threads of a bolt or screw. The term "disc-like" as used in this specification and claims denotes a relatively thin body, which has at least a portion of its periphery arcuate. The disc 1 is dished on the back side, preferably cylindrically rather than spherically concave, although it may be either. By this means only two opposite edges, as at 4 in Fig. 2 contact initially with the work when the same has a planar surface, such as that represented by the section of sheet metal 5 illustrative of a plate to be secured to a frame. A portion of such frame is shown as a flanged section of sheet-metal 6. The parts 5 and 6 have normally aligned openings to receive the bolt 7, the shank of which is threaded, as indicated, and has a point 9 to assist in applying the fasteners, as well as in inserting the screw into the openings of the work when such openings are slightly out of alignment. The end of a screw driver is diagrammatically shown at C, illustrating one means for preventing rotation of the bolt.

It will be seen that the particular (dished) shape of the body 1 minimizes the frictional force of the fastener on the work until such time as the fastener is well tightened on the bolt and that then the frictional force on the work is increased, and the fastener is thereby held against accidental turning and removal.

The provision by which the fastener is adapted to be turned by a suitable tool is, as shown, a pair of holes 10 which form wrench-engaging shoulders. The axes of the holes, as shown, lie in the median plane of the tongues adjacent the base thereof. The holes could be otherwise placed on the disc, but the arrangement indicated is preferred, because thereby the tightening torque is transmitted more directly to the tongues than would be the case if the holes were to be placed, for example, at right-angles to the position thereof shown, in which latter case the applied torque would be more likely to distort the fastener.

Referring now to Fig. 3 and its companion Figures 4 and 5, it will be seen that this form of fastener is very similar to that of Figs. 1 and 2, except that opposite edges 15 of the disc-like body are straight and parallel with the sides of the tongues, thereby decreasing the size of the fastener and saving sheet stock without in any way impairing the strength and effectiveness of the fastener.

A further application of the present invention is illustrated in Fig. 6, wherein 20 designates a sheet-metal frame part having a flange 21 against which it is desired to secure so-called "trim" comprising a metal core plate or sheet 22 and fabric or other non-metallic covering 23 extending around the edge of the core as at 24, and across the bolt head 26. The illustration shows a bolt 25 modified in that the shank just underneath the head is made non-circular, (square, e. g.) as at 27, for engaging a complementary opening in the core sheet 22. The head 26 of the bolt (as shown) is relatively thin and lies in a complementary depression in the sheet 22. The fastener, the details of which may conform to Figs. 1 and 2, is available for adjustment by a hand tool, such as indicated in Fig. 2. It is obvious that with this arrangement the bolt itself cannot be turned to tighten the fastener, because of the inaccessible position of the bolt head beneath the trim cover. The present invention makes possible the tight application of spring fasteners in cases where the head of the bolt is entirely inaccessible for operation thereon by any tool, but in which the fastener itself is accessible.

I claim:—

1. A fastening means for securing a threaded shank element or the like in apertured work, comprising a section of sheet-material having a thickness relatively thin with respect to the cross section of said threaded shank element, means extruded from said section for engaging said threaded shank element in the manner of a nut, and means provided in said section adapted to receive a tool or the like for advancing said section on the said shank element to fastening position against the adjacent face of the work.

2. A fastening means for securing a threaded shank element or the like in apertured work, comprising a disc-like member of a thickness relatively thin with respect to the cross section of said threaded shank element, integral yieldable means deformed from the plane of said disc-like member for engaging said threaded shank element in the manner of a nut, said disc-like member being provided with means adapted to receive a tool or the like for advancing said member on the said shank element to fastening position against the adjacent face of the work.

GEORGE A. TINNERMAN.